United States Patent [19]

Dunn et al.

[11] 4,236,661
[45] Dec. 2, 1980

[54] THERMOCOMPRESSION METHODS OF FORMING SODIUM-SULFUR CELL CASINGS

[75] Inventors: Bruce S. Dunn, Saratoga Springs; Theodore M. Evenden, Pattersonville, both of N.Y.

[73] Assignee: General Electric Company, Schenectady, N.Y.

[21] Appl. No.: 4,175

[22] Filed: Jan. 17, 1979

[51] Int. Cl.³ ............................................. B23K 20/14
[52] U.S. Cl. ................................... 228/184; 29/623.2; 228/193; 228/212; 228/263 A; 228/901
[58] Field of Search ................... 228/122, 184, 263 A, 228/212, 213, 193, 44.1 R, 44.1 A, 901; 29/623.2; 429/104, 174, 185; 269/52, 287

[56] References Cited

U.S. PATENT DOCUMENTS

| | | | |
|---|---|---|---|
| 3,447,233 | 6/1969 | Webb | 228/193 |
| 3,475,220 | 10/1969 | Knorr | 429/104 |
| 3,550,254 | 12/1970 | Greenspan et al. | 228/243 X |
| 3,959,013 | 5/1976 | Breiter | 429/104 X |
| 4,037,027 | 7/1977 | Desplanches et al. | 429/104 |

*Primary Examiner*—Kenneth J. Ramsey
*Attorney, Agent, or Firm*—Paul R. Webb, II; James C. Davis, Jr.

[57] ABSTRACT

Thermocompression methods of forming sodium-sulfur cell casings are described. One method includes positioning an assembly within a die, the assembly having an inward flange at one end of an open ended metallic container positioned against an aluminum washer adjacent each opposite major surface of an electrically insulating ceramic ring, applying pressure to each flange within its respective container, and heating the assembly in an inert atmosphere to bond the containers to the ceramic ring. Another method includes the above steps except that the pressure is applied to the opposite edge of each container.

4 Claims, 2 Drawing Figures

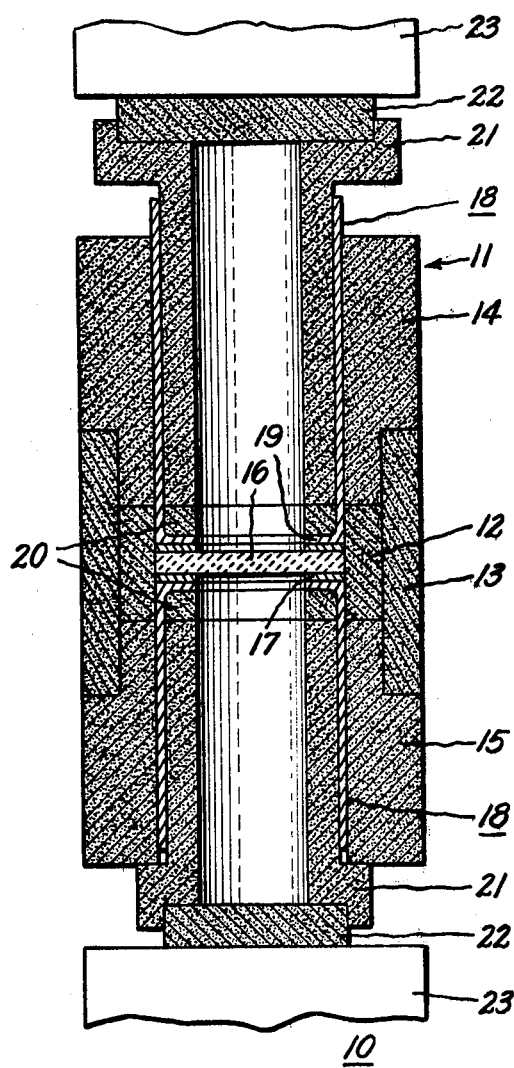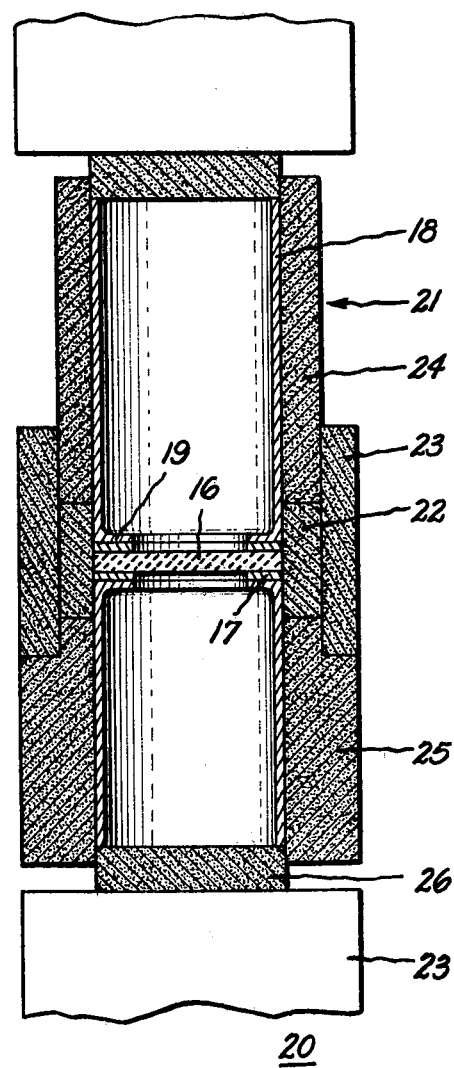

THERMOCOMPRESSION METHODS OF FORMING SODIUM-SULFUR CELL CASINGS

This invention relates to thermocompression methods of forming sodium-sulfur cell casings and, more particular, to such methods wherein a pair of open ended metallic containers are thermocompressed bonded to an electrically insulating ceramic ring within a die.

Sodium-sulfur casings are useful in hermetically sealed sodium-sulfur cells. A cell casing with a hermetic mechanical seal and a hermetically sealed sodium-sulfur cell are described, for example, in U.S. Pat. No. 3,946,751 issued Mar. 30, 1976. In this patent, a hermetic mechanical seal joins two opposite outer metallic casing portions to a ceramic ring supporting an inner casing of a solid sodium ion-conductive material. A hermetically sealed sodium-sulfur cell employs such a cell casing.

Thermocompression bonding is well known for its ability to produce a solid-state bond between metals and ceramics. This type of bond would be of particular interest in sodium-sulfur cells for use in sealing aluminum or other metallic containers to ceramic headers or rings.

In U.S. Pat. No. 4,037,027, there is described a sodium-sulfur electric cell and method of forming the same wherein a cathode tank with an outwardly extending flange and an anode tank with an outwardly extending flange are fixed to an alumina plate or ring by disposing an aluminum seal between the outwardly extending flange of each tank and the plate. A bushing bears on each face of the plate within the respective tanks. This assembly is compressed at a temperature close to, but less than the melting point of aluminum. This disadvantage of the method set forth in this patent is that tanks have outwardly extending flanges as opposed to the inward extending flanges as in applicants' present invention.

In copending patent application Ser. No. 890,593 filed Mar. 20, 1978, and entitled "Methods of Forming Sodium-Sulfur Casings", there is described and claimed methods which include mechanically clamping prior to heating to thermocompress bond an open ended metallic container with an outwardly extending flange to an electrically insulating ceramic ring. This patent describes methods employing a container with an outwardly extending flange as opposed to applicants' present invention.

Our present invention is directed to improved thermocompression methods of forming sodium-sulfur cell casings in which a pair of open ended metallic containers are thermocompressed bonded to an electrically insulating ceramic ring within a die.

The primary object of our invention is to provide improved thermocompression methods of forming sodium-sulfur cell casings.

In accordance with one aspect of our invention, a thermocompression method of forming sodium-sulfur cell casings includes applying pressure to each flange of a pair of opposite open ended containers positioned within a die.

These and other objectives, features and advantages of the invention will be better understood from the following description taken in connection with the accompanying drawing in which:

FIG. 1 is a sectional view of a die with open ended reactant containers positioned therein with their respective inwardly extending flanges against an aluminum washer adjacent each opposite major surface of an electrically insulating ceramic ring; and FIG. 2 is a sectional view of a modified die with reactant containers, aluminum washers and ceramic ring therein.

In FIG. 1 of the drawing, there is shown generally at 10 a die with an assembly employed in one thermocompression method of our invention. A cylindrical die 11 is shown comprising four ring segments 12, 13, 14 and 15 which are easily assembled and disassembled. Segment 12 is surrounded by a wider diameter segment 13. Segments 14 and 15 are positioned against edges of segments 12 and 13. An assembly is positioned within die 11. An electrically insulating ceramic ring 16 of alpha-alumina is centered within die segment 12. An aluminum washer 17 is situated against each opposite major surface of ring 16. A pair of open ended metallic containers 18 of chromized mild steel each have an inward flange 19 at one end thereof. Flange 19 of each container 18 is positioned against each opposite washer 17. A ring is positioned against the interior surface of each flange 19. A plunger 21 fits within each container 18 and presses against its respective ring 20. An end piece 22 fits partially within the outer edge of each plunger 21. A platen 23 of a press (not shown) is shown positioned against the outer surface of each end piece 22. The die and assembly are subsequently contained in a furnace (not shown) with an inert atmosphere. The die and assembly of FIG. 1 is employed to perform one method of thermocompression to form casings for a sodium-sulfur cell.

In FIG. 2 of the drawing, there is shown generally at 20 a die with an assembly employed in another thermocompression method of our invention. A cylindrical die 21 is shown comprising four ring segments 22, 23, 24 and 25 which are easily assembled and disassembled. Segment 22 is surrounded by a wider diameter segment 23. Segment 24 is positioned against one edge of segment 22 and fits partially within segment 23. Segment 25 is positioned against the opposite edge of segment 22 and against one edge of segment 23. An assembly is positioned within die 21. An electrically insulating ceramic ring 16 of alpha-alumina is centered within die segment 22. An aluminum washer 17 is situated against each opposite major surface of ring 16. A pair of open ended metal containers 18 of chromized mild steel, each having an inward flange 19 at one end thereof. Flange 19 of each container 18 is positioned against each opposite washer 17. An end piece 26 fits partially within each of the respective ring segments 24 and 25 and is positioned against the opposite open end of each container 18. A platen 23 of a press (not shown) is shown positioned against the outer surface of each end piece 26. The die and assembly are subsequently contained in a furnace (not shown) with an inert atmosphere. The die and assembly of FIG. 2 are employed to perform another method of thermocompression for forming casings for a sodium-sulfur cell.

We found that the die, including its rings segments, can be made of various materials of which graphite is the preferred material. Similarly, the plunger and end pieces are preferably made of graphite. Another very suitable material for the end pieces is stainless steel. We found further, that when the die and assembly are positioned within the furnace, an inert atmosphere is desirable to prevent erosion of the die and the formation of an oxidizing layer on the washers or on the adjacent surface of the container flanges. Hermetic seals are produced using a range of temperatures from 550° C. to 625° C. with an associated pressure range of 50 to 500 kg/cm$^2$. A time period of 5 minutes to 90 minutes achieves the desired hermetic seals. While various materials such as aluminum and stainless steel may be used for the containers, we found that the preferred material is chromized mild steel. The electrically insulating ceramic ring is preferably alpha-alumina. The washers are preferably made of aluminum.

We found that we sould form by thermocompression sodium-sulfur cell casings by one of our methods wherein pressure is applied to the container flanges. A cylindrical graphite die with four ring segments is easily assembled. A first segment is surrounded by a wider diameter second segment. Two additional segments are positioned against edges of the first and second segments. An assembly is positioned within this die which comprises an electrically insulating ceramic ring of alpha-alumina centered within the first die segment, an aluminum washer situated against each opposite major surface of the ring, a pair of open ended metallic containers of chromized mild steel each having an inward flange at one end thereof with the flange of each container positioned against each opposite washer. A graphite ring is positioned against the interior surface of each flange. A graphite plunger is fitted within each container and presses against its respective ring. A graphite end piece fits partially within the outer edge of each plunger. A platen of a press is positioned against the outer surface of each end piece. The die and assembly are subsequently contained in a furnace with an inert atmosphere.

We found that we could form by thermocompression sodium-sulfur cell casings by another of our methods wherein pressure is applied to the opposite container edge which does not include a flange. A cylindrical graphite die with four ring segments is easily assembled. A first segment is surrounded by a wider diameter second segment. A third segment is positioned against one edge of the first segment and fits partially within the second segment. A fourth segment is positioned against the opposite edge of the first segment and against one edge of the second segment. An assembly is positioned within this die which comprises an electrically insulating ceramic ring of alpha-alumina centered within the first die segment, an aluminum washer situated against each opposite major surface of the ring, a pair of open ended metal containers of chromized mild steel each having an inward flange at one end thereof with the flange of each container positioned against each opposite washer. A graphite end piece fits partially within each of the respective third and fourth ring segments and is positioned against the opposite open end of each container. A platen of a press is positioned against the outer surface of each end piece. The use of a ball bearing fixture enables the pressure to be applied evenly. The die and assembly are subsequently contained in a furnace with an inert atmosphere. In both of the above methods, hermetic seals are produced using a range of temperatures from 550° C. to 625° C., an associated pressure range of 50 to 500 kg/cm$^2$ and a time period of 5 minutes to 90 minutes.

Our methods bond containers with inward flanges either by directly applying pressure to the flange itself or by applying pressure only to the edge of the container. Such containers with inward flanges facilitate heat transfer. Graphite parts are preferred because they must slide against one another at elevated temperatures. In our method wherein pressure is applied to the flanges, turning the flanges inward generally results in curvature at the internal flange/wall intersection. Machining this segment square may be avoided by appropriately shaping the graphite insert adjacent to the flange. It is important that the force be applied directly to the horizontal section of the flange so that the flow of aluminum is evenly distributed.

Our method wherein pressure is applied to the container is particularly attractive for cells because fewer parts with less critical tolerances and shorter dimensions are involved. The distribution of pressure about the flange area is altered, however, processing conditions compensate for this and produce the necessary aluminum flow. The method requires that the container will be sufficiently thick in order to withstand the buoyant forces tending to bend the flange away from the alpha-alumina flange.

The die arrangements and bonding methods of our invention are described as applied to the fabrication of the outer, ceramic-to-metal seal in sodium-sulfur batteries. Our methods are suitable for forming inward flange containers which are to be used in sodium-sulfur batteries. The latter method lends itself extremely well to large-scale production methods. In addition to its simpler tooling requirements, processing conditions appear to be compatible with high production rates.

Examples of sodium-sulfur cell casings made in accordance with the methods of our invention are set forth below:

EXAMPLE I

A plurality of sodium-sulfur cell casings were formed by one of our methods wherein pressure was applied to the container flanges. Each cell casing was formed by providing a cylindrical graphite die with four ring segments. The die had a first segment which was surrounded by a wider diameter second segment. Two additional segments were positioned against edges of the first and second segments. An assembly was positioned within this die which comprised an electrically insulating ceramic ring of alpha-alumina centered within the first die segment. An 0.75 mm aluminum washer was situated against each opposite major surface of the ceramic ring. A pair of open ended metallic containers of chromized mild steel having a thickness of 1 mm and each having an inward flange at one end thereof had the flange of each container positioned against each opposite washer. A graphite ring was positioned against the interior surface of each flange. A hollow graphite plunger was fitted within each container and pressed against its respective graphite ring. A graphite end piece was fitted partially within the outer edge of each plunger. A platen of a press was positioned against the outer surface of each end piece. The die and assembly were contained in a furnace with an inert atmosphere. The assembly was subjected to a temperature of 575° C. for 30 minutes with a pressure of 275 kg/cm$^2$ applied to each flange. A hermetic seal was produced between each flange and the respective surface of the ceramic ring. Subsequent four-point bend test of these seals indicated a modulus of rupture in excess of 6000 psi. The resulting structure was a cell casing made in accordance with one method of our invention.

EXAMPLE II

A plurality of sodium-sulfur cell casing were formed by another of our methods wherein pressure was applied to each opposite container edge which does not include a flange. Each cell casing was formed by providing a cylindrical graphite die with four ring segments. The die had a first segment which was surrounded by a wider diameter second segment. A third segment was positioned against one edge of the first segment and fits partially within the second segment. A fourth segment was positioned against the opposite edge of the first segment and against one edge of the second segment. An assembly was positioned within this die which comprised an electrically insulating ceramic ring of alpha-alumina centered within the first die segment. A 1.5 mm aluminum washer was situated against each opposite major surface of the ceramic ring. A pair of open ended metal containers of chromized mild steel having a thickness of 1.5 mm and each having an inward flange at one end thereof had the flange of each container positioned against each opposite washer. A graphite end piece was fitted partially within each of the respective third and fourth ring segments and was positioned against the opposite open end of each container. A platen of a press was positioned against the outer surface of each end piece. The die and assembly were contained in a furnace with an inert atmosphere. The assembly was subjected to a temperature of 600° C. for 90 minutes with a pressure of 375 kg/cm$^2$ applied to each opposite open end of each container. A hermetic seal was produced between each flange and the respective surface of the ceramic ring. The resulting structure was a cell casing made in accordance with one method of our invention.

EXAMPLE III

A plurality of sodium-sulfur cell casings were formed by another of our methods wherein pressure was applied to each opposite container edge which does not include a flange. Each cell casing was formed by providing a cylindrical graphite die with four ring segments. The die had a first segment which was surrounded by a wider diameter second segment. A third segment was positioned against one edge of the first segment and fits partially within the second segment. A fourth segment was positioned against the opposite edge of the first segment and against one edge of the second segment. An assembly was positioned within this die which comprised an electrically insulating ceramic ring of alpha-alumina centered within the first die segment. A 1.5 mm aluminum washer was situated against each opposite major surface of the ceramic ring. A pair of open ended metal containers of chromized mild steel having a thickness of 1.5 mm and each having an inward flange at one end thereof had the flange of each container positioned against each opposite washer. A graphite end piece was fitted partially within each of the respective third and fourth ring segments and was positioned against the opposite end of each container. A platen of a press was positioned against the outer surface of each end piece. The die and assembly were contained in a furnace with an inert atmosphere. The assembly was subjected to a temperature of 600° C. for 30 minutes with a pressure of 375 kg/cm$^2$ applied to each opposite open end of each container. A hermetic seal was produced between each flange and the respective surface of the ceramic ring. The resulting structure was a cell casing made in accordance with one method of our invention.

While other modifications of the invention and variations thereof which may be employed within the scope of the invention have not been described, the invention is intended to include such as may be embraced within the following claims:

What we claim as new and desire to secure by Letters Patent of the United States is:

1. A method of forming a sodium-sulfur cell casing which comprises providing a cylindrical die, centering an electrically insulating ceramic ring within the die, situating a metallic washer against each opposite major surface of the ceramic ring, providing a pair of open ended metallic containers each having an inward flange at one end thereof with the flange of each container positioned against each opposite washer, positioning a ring within each container against the interior surface of each flange, fitting a plunger within each container and pressing against its respective ring, fitting an end piece partially within the outer edge of each plunger, subjecting simultaneously each flange to a pressure in the range of 50 to 500 kg/cm$^2$ for a period of time from five minutes to ninety minutes, and subjecting simultaneously the die in an inert atmosphere to a temperature in the range from 550° C. to 625° C.

2. A method of forming a sodium-sulfur cell casing as in claim 1, in which the cylindrical die is graphite, the die has a first ring segment surrounded by a wider diameter second segment, and two additional ring segments positioned against the edges of the first and second segments.

3. A method of forming a sodium-sulfur cell casing as in claim 1, in which the cylindrical die is graphite, the electrically insulating ceramic ring is alpha-alumina, the metallic washer is aluminum, the metallic containers are chromized mild steel, the ring within the container is graphite, the plunger is graphite, and the end piece is graphite.

4. A method of forming a sodium-sulfur cell casing as in claim 1, in which the cylindrical die is graphite, the die has a first ring segment surrounded by a wider diameter second segment, and two additional ring segments positioned against the edges of the first and second segments, the insulating ceramic ring is alpha-alumina, the metallic washer is aluminum, the metallic containers are chromized mild steel, the ring within the container is graphite, the plunger is graphite, the temperature is 575° C., the time period is 30 minutes, and the pressure is 275 kg/cm$^2$.

* * * * *